Dec. 19, 1933.  R. L. HASCHE  1,939,696
SEPARATION OF GASES
Original Filed Jan. 21, 1931
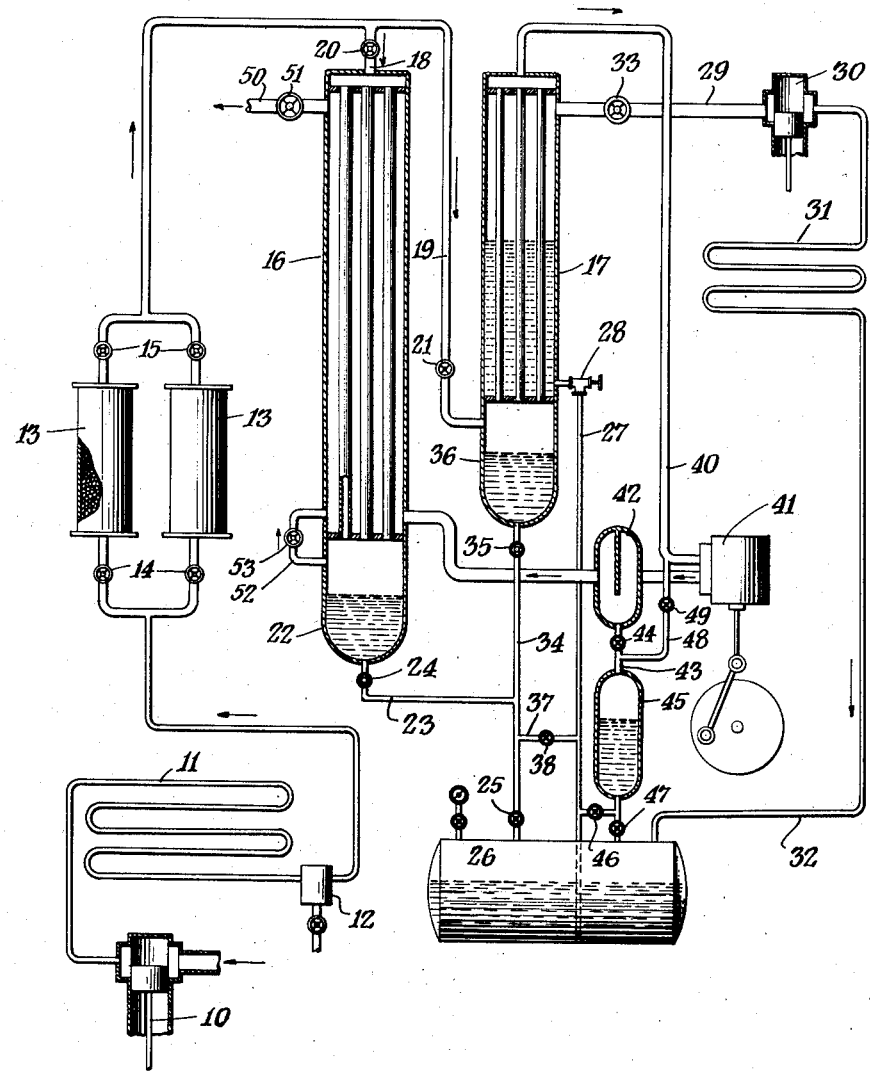
Inventor
Rudolph L. Hasche
By Attorney
Austin & Fix Patented Dec. 19, 1933

1,939,696

UNITED STATES PATENT OFFICE 1,939,696

SEPARATION OF GASES

Rudolph Leonard Hasche, Red Bank, N. J., assignor to American Smelting and Refining Company, New York, N. Y., a corporation of New Jersey Application January 21, 1931. Serial No. 510,154
Renewed March 10, 1933

10 Claims. (Cl. 183—115)

This invention relates to the separation and recovery of gases from gas mixtures in which the constituent to be recovered may be present in various proportions.

The invention provides a low temperature system wherein the constituent is separated by cooling the mixture to substantially the solidification point of the constituent so that practically the entire content thereof liquefies and may be removed in the liquid state. Means is provided for making sufficient refrigeration available for cooling the gas to the necessary low temperature and for controlling the amount of such refrigeration as may be required for gases of various percentages.

The invention provides a flexible and efficient system of the type above indicated which is capable of operating on a minimum power requirement and which effects a high recovery of the desired constituent.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out may be better understood by referring to the following description taken in connection with the accompanying drawing forming a part thereof, in which the figure illustrates diagrammatically a system arranged in accordance with the present invention.

In the following description and in the claims certain details will be identified by specific names for convenience, but they are intended to be as generic in their application as the art will permit.

The present invention provides a refrigerating system in which the incoming gases are compressed and dried and are divided into two parts, one part of which is cooled to approximately the solidification point of the desired constituent in a heat exchanger and the other part of which is cooled to the same temperature in two steps. The first step takes place in a heat exchanger in which evaporating liquid is used as a source of refrigeration and the second step takes place in an expansion engine. The stripped gases from both of said parts are utilized as the refrigerant in the first heat exchanger. The relative amounts of the gases contained in the two parts are varied in accordance with the percentage of the constituent to be recovered and in accordance with the amount of refrigeration required and may be so controlled that a heat balance is obtained in the system.

The process is particularly applicable to the separation of sulphur dioxide from smelter gases and from by-product gases, particularly from gases rich in sulphur dioxide, and may also be applied to various other gas mixtures, such as the recovery of certain volatile hydrocarbons from petroleum gases.

The system may be more readily understood by referring to the drawing which shows a compressor 10 in which the incoming gases containing, for example, sulphur dioxide, hydrocarbons or other desired constituents are compressed to a predetermined high pressure, as for example, to a pressure of 20—30 atmospheres. The heat of compression is removed by coils 11 which may be cooled by any convenient medium such as water. The condensed moisture, oil or other liquid impurity is then removed in separator 12 and the compressed gases are applied to one of a pair of dehydrators 13 which may comprise, for example, beds of silica gel. Suitable valves 14 and 15 permit one of said beds to be used for dehydrating the compressed gases while the other of said beds is cut out of service for reactivation. These beds serve to remove traces of moisture and other gaseous impurities.

After leaving these dehydrators the gas is divided into two portions which are applied to the tubes of exchangers 16 and 17 through pipes 18 and 19 respectively. Valves 20 and 21 are used to control the relative amount of the gas which is applied to each of the two exchangers. The apportionment of the gas between the two exchangers will depend upon the heat balance of the system as determined by the amount of liquefiable constituent in the gas, its latent heat of vaporization and the total pressure on the system.

The gases passing through the tubes of exchanger 16 are cooled by heat interchange with cold stripped gases which are obtained from subsequent steps in the process. The cooling is carried out to a temperature approaching the solidification point of the desired constituent. Said constituent accordingly passes into the liquid state and collects in pot 22 from which it may be withdrawn through pipe 23 and 34 and valves 24 and 25 into storage tank 26.

The second portion of the incoming compressed gases is applied to the tubes of exchanger 17 preferably at the bottom, and is cooled therein to an intermediate temperature by heat adsorbed from the evaporating liquid which is maintained in the shell compartment of said exchanger. Said liquid may comprise the cold liquid taken from storage tank 26 through pipe 27 and expansion valve 28. The vapor is withdrawn through pipe 29 and recompressed in compressor 30 to a pressure such that it becomes liquid when the heat of compression is removed.

The heat of compression is removed in cooling coils 31 whereby the constituent is reliquefied and returned to storage tank 26 through pipe 32. Valve 33 in pipe 29 controls the suction pressure of compressor 30 and the corresponding pressure in the shell of exchanger 17 above the evaporating liquid which in turn determines the boiling point of the liquid therein and the amount of heat available for refrigeration.

The liquefied products which separate in the tubes of exchanger 17 are collected in pot 36 and may be applied through pipe 34 and valves 35 and 25 to storage tank 26. Pipe 37 interconnects pipes 34 and 27 and is provided with valve 38 which permits the liquid to be applied to the shell of exchanger 17 directly from pot 22 through valves 24 and 38, directly from pot 36 through valves 35 and 38 or from storage tank 26 through pipe 27.

The cold gases from exchanger 17 are removed through pipe 40 and applied to expanding engine 41 wherein they are expanded adiabatically with the production of external work and are cooled to a temperature approaching the solidification point of the desired constituent. The exhaust gases from said engine are passed through separator 42 wherein the liquefied constituent is removed and may be withdrawn through pipe 43 and valve 44 into pot 45 which may be connected to pipe 27 and to storage tank 26 by suitable pipe connections controlled by valves 46 and 47 respectively. In order to permit the liquid which is under the exhaust pressure of the engine to be applied to tank 26, which is under high pressure, a pressure line 48 having valve 49 is provided between pot 45 and high pressure line 40. When valve 44 is closed and valve 49 is open, the liquid in pot 45 may thus be blown into storage tank 26, or if valve 47 is closed and valve 46 is open it may be directly applied to the shell of exchanger 17.

The stripped gases leaving separator 42 are applied to the shell of exchanger 16 and serve as a cooling medium therein after which they are discarded through pipe 50 controlled by valve 51. The stripped gases derived from the tubes of exchanger 16 are withdrawn from pot 22 through pipe 52 and are passed through expansion valve 53 in which they are expanded to a pressure corresponding to the low pressure gases received from separator 42 and are applied to the shell side of exchanger 16 where they mix with the stripped gases from said separator 42 and constitute a further cooling medium for said exchanger.

It is obvious that the stripped gases from exchanger 16, which are under the pressure of the gases applied to the expanding engine, may be applied directly thereto and expanded in said engine, after which they may be utilized as the cooling medium in the shell of exchanger 16 in the manner above specified. In this case the expansion valve 53 may be omitted inasmuch as all of the expansion, both of the gases from exchanger 16 and of the gases from exchanger 17, may take place in the expanding engine, or the distribution of the gases between the two expanding devices may be regulated in accordance with the amount of refrigeration required. It is also obvious that the distribution of the incoming gases between the various refrigerating elements may be controlled as required in accordance with the content of the gas mixture so as to produce the necessary amount of refrigeration.

Applying the process specifically, by way of illustration only, to the separation of sulphur dioxide from gas mixtures containing that constituent, the gas may be compressed to a pressure of some 20—30 atmospheres and after the heat of compression is removed and the gas is dried, it is divided between exchangers 16 and 17 in accordance with the specific conditions. The portion in exchanger 16 may be cooled to a temperature approaching the solidification temperature of sulphur dioxide, for example, to a temperature of —70° C. The part applied to exchanger 17 may be cooled in said exchanger to a temperature of say —26° C. and the cooling of that part may be completed to a temperature of approximately —70° C. in the expanding engine. The liquefied constituent which is expanded through valve 28 may be maintained at a pressure of about 7.5 lbs. absolute by suitable control of valve 33 and the vapor may be compressed in compressor 30 to a pressure of 80 lbs. absolute and liquefied in water cooling coils 31.

The specific temperatures and pressures in the different parts of the system vary greatly in accordance with the nature of the gas to be recovered and the strength of the gas. It will be understood that the above specific temperatures are given by way of illustration only and not as a limitation of the process.

While certain novel features of the invention have been shown and described and are pointed out in the annexed claims, it will be understood that various omissions, substitutions and changes in the forms and details of the system illustrated and in its operation may be made by those skilled in the art without departing from the spirit of the invention.

What is claimed is:

1. A process for separating and recovering a gaseous constituent from a gas mixture which comprises compressing said mixture, dividing the compressed mixture into two parts, cooling one of said parts by heat exchange with cold gases to a temperature approaching the solidification temperature of said constituent, recovering and removing the liquefied constituent therefrom, cooling the other of said parts by heat interchange with an evaporating liquid, continuing the cooling thereof to a point approaching the solidification temperature of said constituent by expanding said part adiabatically with the production of external work, removing the liquefied constituent and utilizing a portion of said liquefied constituent as the evaporating liquid for said heat interchange.

2. A process for separating and recovering a gaseous constituent from a gas mixture which comprises compressing said mixture, dividing the compressed mixture into two parts, cooling one of said parts by heat exchange with cold gases to a temperature approaching the solidification temperature of said constituent, recovering and removing the liquefied constituent therefrom, cooling the other of said parts by heat interchange with an evaporating liquid, continuing the cooling thereof to a point approaching the solidification temperature of said constituent by expanding said part adiabatically with the production of external work, removing the liquefied constituent, utilizing a portion of said liquefied constituent as the evaporating liquid for said heat interchange, recompressing the vapor therefrom and reliquefying the same and returning said liquid to the final product.

3. A process for separating and recovering a gaseous constituent from a gas mixture which comprises compressing said mixture, dividing the compressed mixture into two parts, cooling one of said parts by heat exchange with cold gases to a temperature approaching the solidification temperature of said constituent, recovering and removing the liquefied constituent therefrom, cooling the other of said parts by heat interchange with an evaporating liquid, continuing the cooling thereof to a point approaching the solidification temperature of said constituent by expanding said part adiabatically with the production of external work, removing the liquefied constituent, utilizing the stripped gases after said removal as a source of refrigeration in said first mentioned cooling step, utilizing a portion of said liquefied constituent as the evaporating liquid for said heat interchange, recompressing the vapor therefrom and reliquefying the same and returning said liquid to the final product.

4. A process for separating and recovering a gaseous constituent from a gas mixture which comprises compressing said mixture, dividing the compressed mixture into two parts, cooling one of said parts by heat exchange with cold gases to a temperature approaching the solidification temperature of said constituent, recovering and removing the liquefied constituent therefrom, utilizing the stripped gases from said part after removal of said liquid as a source of refrigeration in said cooling step, cooling the other of said parts by heat interchange with an evaporating liquid, continuing the cooling thereof to a point approaching the solidification temperature of said constituent by expanding said part adiabatically with the production of external work, removing the liquefied constituent, utilizing the stripped gases after said removal as a source of refrigeration in said first mentioned cooling step, utilizing a portion of said liquefied constituent as the evaporating liquid for said heat interchange, recompressing the vapor therefrom and reliquefying the same and returning said liquid to the final product.

5. A process for separating and recovering sulphur dioxide from a gas mixture which comprises compressing said mixture to a pressure of 20—30 atmospheres, dividing the compressed mixture into two parts, cooling one of said parts by heat exchange with cold gases to a temperature of approximately $-70°$ C., recovering and removing the liquefied sulphur dioxide therefrom, utilizing the stripped gases from said part after removal of said liquid as a source of refrigeration in said cooling step, cooling the other of said parts by heat interchange with an evaporating liquid to a temperature of approximately $-26°$ C., continuing the cooling thereof to approximately $-70°$ C. by expanding said part adiabatically with the production of external work, removing the liquefied constituent, utilizing the stripped gases after said removal as a source of refrigeration in said first mentioned cooling step, utilizing a portion of said liquefied constituent as the evaporating liquid for said heat interchange, recompressing the vapor therefrom to liquefy same and returning the resulting liquid to the final product.

6. A process for separating and recovering $SO_2$ from a gas mixture which comprises compressing said mixture to a pressure of 20—30 atmospheres, dividing the compressed mixture into two parts, cooling one of said parts by heat exchange with cold gases to a temperature of approximately $-70°$ C., recovering and removing the $SO_2$ therefrom, utilizing the stripped gases from said part after removal of said liquid as a source of refrigeration in said cooling step, cooling the other of said parts by heat interchange with an evaporating liquid to a temperature of approximately $-26°$ C., continuing the cooling thereof to approximately $-70°$ C. by expanding said part adiabatically with the production of external work, removing the liquefied constituent, utilizing the stripped gases after said removal as a source of refrigeration in said first mentioned cooling step, utilizing a portion of said $SO_2$ as the evaporating liquid for said heat interchange, maintaining a pressure of approximately 7.5 lbs. absolute on said evaporating liquid, recompressing the vapor therefrom to a pressure of approximately 80 lbs. absolute and liquefying the same and returning said liquid to the final product.

7. A process for the recovery of a constituent from a gas mixture which comprises compressing said mixture and drying the same, dividing the compressed mixture into two parts, cooling one of said parts by heat interchange at a temperature at which a portion of said constituent is liquefied, removing the liquefied portion, expanding the stripped gases and utilizing the same as a source of refrigeration for said part, cooling the other of said parts by heat interchange to a temperature at which a portion of said constituent is liquefied, removing said liquefied portion, continuing the cooling of said other part by expansion to a temperature at which a further quantity of said constituent is liquefied, removing said liquefied constituent and utilizing the stripped gases as a source of refrigeration in one of said heat interchange steps.

8. A process for the recovery of a constituent from a gas mixture which comprises compressing said mixture and drying the same, dividing the compressed mixture into two parts, cooling one of said parts by heat interchange at a temperature at which a portion of said constituent is liquefied, removing the liquefied portion, expanding the stripped gases and utilizing the same as a source of refrigeration for said part, cooling the other of said parts by heat interchange to a temperature at which a portion of said constituent is liquefied, removing the liquefied portion, continuing the cooling of said other part by adiabatic expansion with the production of external work to a temperature at which a further quantity of said constituent is liquefied, removing said liquefied constituent and utilizing the stripped gases as a source of refrigeration in one of said heat interchange steps.

9. A process for the recovery of a constituent from a gas mixture which comprises compressing said mixture and drying the same, dividing the compressed mixture into two parts, cooling one of said parts by heat interchange at a temperature at which a portion of said constituent is liquefied, removing the liquefied portion, expanding the stripped gases and utilizing the same as a source of refrigeration for said part, cooling the other of said parts by heat interchange to an intermediate temperature at which a portion of said constituent is liquefied, removing said liquefied portion, continuing the cooling of said other part by expansion to a temperature at which a further quantity of said constituent is liquefied, removing said liquefied constituent and utilizing the stripped gases as a source of refrigeration for said first part, causing a portion of said liquid to evaporate and using the evaporating liquid as a source of refrigeration for cooling said second part to the intermediate temperature in the step above mentioned.

10. A process for the recovery of a constituent from a gas mixture which comprises compressing said mixture and drying the same, dividing the compressed mixture into two parts, cooling one of said parts by heat interchange at a temperature at which a portion of said constituent is liquefied, removing the liquefied portion, expanding the stripped gases and utilizing the same as a source of refrigeration for said part, cooling the other of said parts by heat interchange to a temperature at which a portion of said constituent is liquefied, removing said liquefied portion, continuing the cooling of said other part by expansion to a temperature at which a further quantity of said constituent is liquefied, removing said liquefied constituent and utilizing the stripped gases as a source of refrigeration in one of said heat interchange steps, and controlling the relative quantities of said parts so as to produce the necessary amount of refrigeration for liquefying the desired constituent.

RUDOLPH LEONARD HASCHE.